H. C. ABERN AND F. J. BAIVIER.
SIDE DRAFT ELIMINATOR.
APPLICATION FILED MAR. 13, 1920.

1,379,074. Patented May 24, 1921.

Inventors
Halsey Cameron Abern
Felix J. Baivier
By Mowell & Keeney,
Attorneys.

UNITED STATES PATENT OFFICE.

HALSEY CAMERON ABERN AND FELIX J. BAIVIER, OF RACINE, WISCONSIN.

SIDE-DRAFT ELIMINATOR.

1,379,074.  Specification of Letters Patent.  Patented May 24, 1921.

Application filed March 13, 1920. Serial No. 365,673.

*To all whom it may concern:*

Be it known that we, HALSEY CAMERON ABERN and FELIX J. BAIVIER, citizens of the United States, and residents of Racine, in the county of Racine and State of Wisconsin, have invented new and useful Improvements in Side-Draft Eliminators, of which the following is a description, reference being had to the accompanying drawings, which are a part of this specification.

The present invention relates to certain new and useful improvements in farming implements, and refers more particularly to implements of the harvesting and binding type.

In the harvesting and binding machines now in every-day use, a single main supporting bull wheel is provided having connections with the cutting, binding and other mechanism, and a lighter side wheel is employed to support the outer end of the harvester. The light harvester supporting wheel has been an idle wheel and in use the same will tend to lag or hang behind and create a pull upon the machine, whereas it should be running without any side draft whatsoever.

Hence with the above and other objections in mind, our invention has for one of its objects to provide means for coupling the lighter side wheel with the main bull wheel to eliminate such side draft.

Another object of the present invention is to provide a side draft eliminator of the class described which may be embodied in the machines now in use or in machines at the time of their manufacture.

A further object of the present invention is to provide a side draft eliminator for harvesting and binding machines which will embody a substantially flexible drive connection between the main bull wheel and the lighter idler wheel which is also provided with a differential mechanism to compensate for the turning of the device when one of the wheels revolves at a greater speed than the other.

With the above and other objects in view which will appear as the description proceeds, our invention resides in the novel construction, combination and arrangement of parts substantially as hereinafter described and more particularly defined by the appended claim, it being understood that such changes in the precise embodiment of the herein disclosed invention may be made as come within the scope of the claim.

Figure 1:
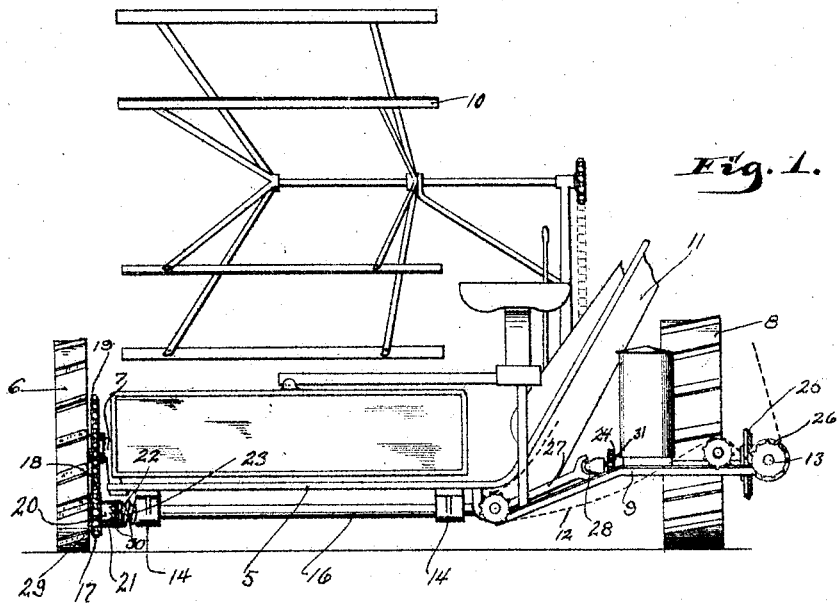
Figure 2:
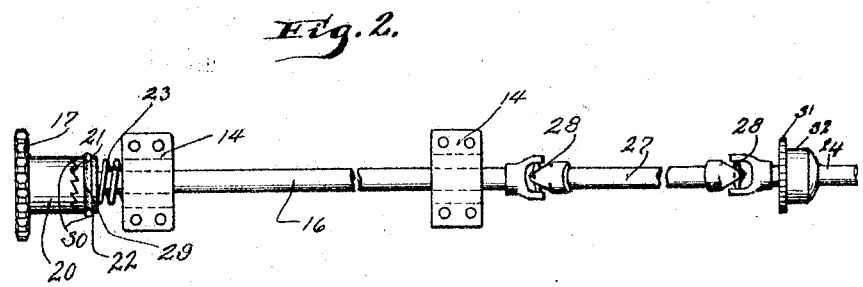

In the accompanying drawing we have illustrated one complete example of the physical embodiment of our invention constructed according to the best mode we have so far devised for the practical application of the principles thereof, and in which:

Figure 1 is a rear elevational view of a harvesting and binding machine embodying our invention, parts of the harvesting and binding mechanism being removed from the drawing, and Fig. 2 is a top plan view of the sectional drive shaft we employ for drivingly connecting the bull wheel with the side idler wheel, and which is driven from the end of the jack shaft or any moving member most suitable for the purpose.

Referring now more particularly to the accompanying drawing, the numeral 5 designates generally the frame of the harvesting portion of a harvesting and binding machine having its outer end supported by a wheel 6 journaled on an axle 7 carried by said frame and its inner end supported by a main bull wheel 8 journaled within a supplemental supporting frame 9 connected with the frame 5. As is usual in machines of this character, a reel or revolving beater 10 is journaled above the cutting members (not shown) and is adapted to sweep the cut grain onto the main frame 5 from where it is conveyed by an endless conveyer or the like 11 to the binding mechanism, (not shown), said revolving beater, conveyer, etc., being driven from the bull wheel 8 by means of sprocket and chain connections 12 connected with a jack shaft 13 in drive connection with the bull wheel.

All of the foregoing may be of any well known construction, and as before stated, it has heretofore been the practice to have the wheel 6 an idler wheel and the present invention consists in drivingly connecting the wheel 6 with the bull wheel 8.

Journaled in bearing members 14 secured to the under side of the frame 5 is a transverse shaft 16 having a sprocket wheel 17 revolubly secured to its outer end and connected by a sprocket chain 18 with a sprocket wheel 19 fixed to the wheel 6.

The hub 20 of the sprocket wheel 17 has teeth 21 formed thereon and co-acting with like teeth formed on a clutch member 22 slidably but non-rotatably secured to the shaft 16, said clutch member being normally urged to engagement with the sprocket wheel 17 by means of a spring 23 to drivingly connect the sprocket 17 with said shaft. The teeth of the clutch members are so shaped that when the wheel 6 travels faster than the wheel 8, the teeth 21 will slip over each other as will be readily apparent.

Journaled in the frame 9 parallel with the shaft 16, but on a substantially higher plane, is a shaft 24 having its outer end connected with the jack shaft 13 by means of a bevel gear 25 engaged with a bevel gear 26 secured to said jack shaft. The inner ends of the shafts 16 and 24 are drivingly connected by an inclined intermediate shaft 27 having its ends connected with the inner ends of the shafts 16 and 24 by means of universal joints 28. This construction permits the flexibility of the device and at the same time provides a positive drive connection between the wheels as will be readily apparent.

The clutch member 22 is grooved as at 29, and has engaged therein the forked end 30 of a control lever (not shown) connected to an operating handle (not shown) adjacent the driver's seat so that the clutch 21 may be readily engaged and disengaged to either render the drive connection operable or inoperative.

In the present construction the shaft 24 has freely journaled thereon, adjacent its universal joint 28, a sprocket wheel 31 having a chain connection (not shown) with the bull wheel 8. The sprocket wheel 31 has means (not shown) within its hub 32 for releasably connecting the wheel with the shaft 24, but as this construction forms no important part of the present invention the same has not been shown in the drawing.

What we claim as our invention is:

A side draft eliminator for harvesting and binding machines and the like comprising a harvester frame, a main bull wheel supporting one end thereof, a side wheel supporting the other end thereof, a shaft transversely journaled in the frame and having one end thereof terminating adjacent said side wheel, a second shaft journaled in the frame substantially parallel with the other shaft and on a higher plane, an inclined shaft, universal joint means connecting the ends of said inclined shaft with the inner ends of said parallel shafts, and means drivingly connecting the outer ends of said shafts with said wheels.

In testimony whereof we affix our signatures.

HALSEY CAMERON ABERN.
FELIX J. BAIVIER.